United States Patent [19]

Küster et al.

[11] 4,045,342
[45] Aug. 30, 1977

[54] METHOD AND APPARATUS FOR FILTERING

[75] Inventors: Jürgen Küster, Bad Munster; Hermann Schlosser, Guldental, both of Germany

[73] Assignee: Seitz-Werke GmbH, Bad Kreuznach, Germany

[21] Appl. No.: 649,408

[22] Filed: Jan. 15, 1976

[30] Foreign Application Priority Data

Jan. 17, 1975 Germany ............................ 2501733

[51] Int. Cl.² ............................................. B01D 23/24
[52] U.S. Cl. ................................ 210/81; 137/625.48; 210/96 R
[58] Field of Search ............................ 210/96, 79, 81; 137/118, 625.48

[56] References Cited

U.S. PATENT DOCUMENTS

| | | | |
|---|---|---|---|
| 2,657,700 | 11/1953 | Ray | 210/96 X |
| 3,677,406 | 7/1972 | King et al. | 210/96 X |
| 3,911,957 | 10/1975 | McQueen | 137/625.48 |

Primary Examiner—Frank W. Lutter
Assistant Examiner—William A. Cuchlinski, Jr.
Attorney, Agent, or Firm—Walter Becker

[57] ABSTRACT

A method and apparatus for filtering, especially for filtering beer, in which a filter having an inlet and an outlet has the outlet connected with the conduit system leading to first and second tanks and to drain. The filter is flushed with water periodically and a control system is provided which senses the density of the fluid at the filter outlet and controls valves in the conduit system. The control of the valves provides for diverting fluid from the filter outlet from a first beer storage tank to an intermediate tank when the density of the fluid at the filter outlet is modified by water and then from the second tank to drain when the density of the fluid at the filter outlet stabilizes. In returning to beer filtration, the fluid at the filter outlet is supplied to the drain until the density is substantially modified by beer at which time the fluid is diverted to the aforementioned second tank and thereafter, when the density of the fluid of the filter outlet stabilizes, the filter outlet is again connected to the beer storage tank.

14 Claims, 2 Drawing Figures

METHOD AND APPARATUS FOR FILTERING

The present invention relates to a method of and device for ascertaining the reversing points for mixing fluids in connection with the filtration by means of settling filters or mass filters for determining the density of the liquid by means of a density measuring device at the filter outlet. With filtrations of beverages by means of settling filters, layer filters or mass filters for the liquid displacement within the filter as it occurs during the leading and trailing phase, a precise limitation of the beverage from the leading or trailing phase is required for liquid, depending on the respective composition is for further use fed into one or another tank, or the liquid is discharged into the sewer. This requirement applied above all to beer filtration in which instance the leading or trailing liquid may be water or a type of beer which differs from the beer to be filtrated which is to be passed into a separate tank. The reversing points decisive in all these instances for the change in the transport direction are adapted to be ascertained by various measuring processes.

Thus, "Thormetall Information", sheet 714004-223 of the Thormetall Gesellschaft mbH, 4 Düsseldorf 30, Federal Republic of Germany, has suggested to ascertain the reversing point for the initial water and the initial beer and for the beer trailing and water trailing by measuring the density of the liquid flowing off from the filter. To this end, at the filter outlet a density meter is arranged, the measure values of which are in a control device continuously and automatically compared with adjustable rated values. If the measured values correspond to the rated values, provided optical and acoustical devices initiate signals which cause the operator or provided magnetic valve to change the transporting direction of the liquid.

Due to the orientation of the measured values according to the above mentioned known method orientation on the selected rated values which characterizes the upper and lower tolerance limit for the respective density of the product, the ascertainment of the correct reversing points is not always assured. Thus, with the filtration of one and the same type of beer, it may occur that the ascertained measured values briefly are above or below the rated values, and the indication of reversing points is effected or not effected even though the respective maximum density of value of the beer had not been measured or had already been measured.

It is, therefore, an object of the present invention, for purposes of ascertaining the reversing points for mixing fluids during the filtration with settling filters, layer filters or mass filters to provide a method which deliberately does without predetermined rated values and which avoids the comparison of the measured density with the rated values.

This object and other objects and advantages of the invention will appear more clearly from the following specification in connection with the accompanying drawings, in which.

Figure 1:
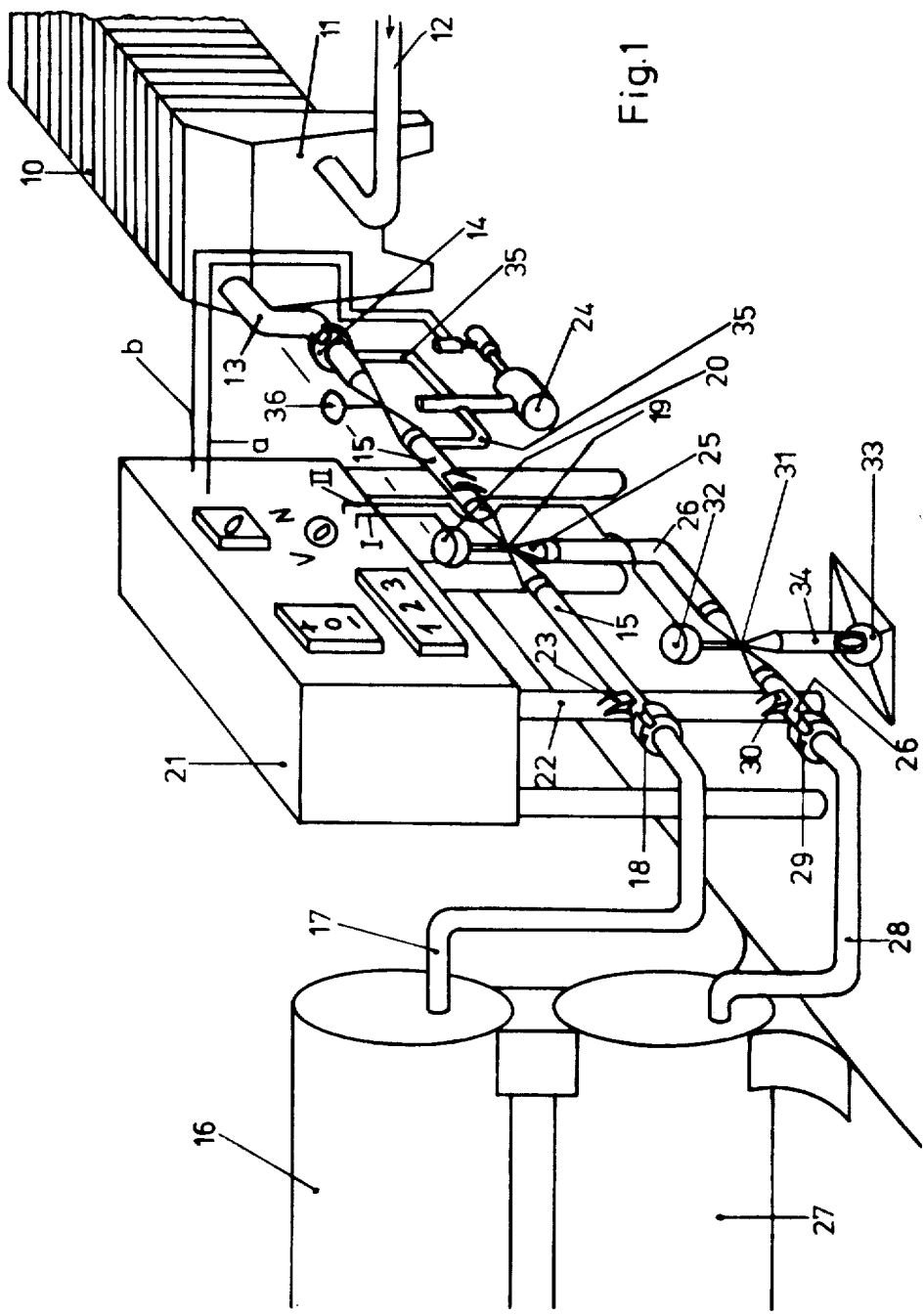
FIG. 1 illustrates an apparatus according to the invention which is associated with a settling filter for ascertaining the reversing points.

Starting from the suggestion of the above mentioned known measuring method, namely to ascertain the reversing points by determining the density of the liquid by means of a density meter arranged in the filter outlet, the above outlined object has been realized according to the present invention by carrying out density measurements in definite time sequences and to compare the ascertained value with each other as to equal value and in case these values differ from each other always fix a first reversing point and when equal value has been obtained to fix a subsequent reversing point. The suggested method according to the invention thus takes into full consideration any change in the density of the mixing liquid and in case of changes between the same or similar density values furnishes a first reversing point and with values which remain the same furnishes the subsequent reversing point. In this way, the initial flow as well as the post flow will also when the change in the types of beer indicates intermediate flow be recognizable and the operator will be able to determine the respective reversing points. For this determination of the reversing points by continuous ascertainment and comparison of density values as to equivalence, it is provided according to a further development of the invention that for fixing the first reversing point an ascertained density value is stored as reference value and this value is then compared with the subsequent ascertained density value as to possible deviating value. Thereupon, for ascertaining the subsequent reversing point, the density value ascertained during the fixing of the first reversing point after storing the reference value is stored in its turn as reference value and compared with one or more subsequently ascertained density values. If a difference in the value is ascertained, the respective subsequently ascertained density value is in its turn stored as reference value and is compared with subsequently ascertained density values, and of these values when a difference in value is ascertained, one density value is stored as reference value. This process is continued until equivalence between a stored and an ascertained value exists. In this connection the equivalence required by the invention between a stored and ascertained density value may lie within a freely selectable tolerance.

According to a further development of the invention, expediently with increasing density values, the positive deviation from the reference value, and with a decrease in the density values, the negative deviation from the reference value is indicated and the time sequence is adapted to the filter volume and the flow velocity of the mixing fluid in the interior of the filter.

For purposes of practicing the method according to the invention, a device according to the invention is suggested which forms a pipe construction designed as independent structural unit. This structural unit primarily consists of a conduit connectable by disengageable connections to the filter outlet and to the tank inlet conduit with interposed remote controlled three-way valve and with a measured value receiver provided in the direction to the filter discharge, and furthermore with a conduit which branches off from the three-way valve and with a measured value receiver provided in the direction to the filter discharge, and furthermore with a conduit which branches off from the three-way valve and is connectable to the tank inlet conduit by means of a detachable connection, with a further interposed remote controllable three-way valve and an outlet conduit branching off therefrom. According to the invention, with this detachable and movable arrangement, the measured value receiver directly precedes the three-way valve, and the measured value receiver as well as the two three-way valves communicate through control conduits with control devices which are arranged in a common control apparatus carried by supports. The pipe arrangement may be detachable connected to said supports.

Referring now to the drawings in detail, the apparatus according to FIG. 1 comprises a settling filter 10 instead of which, of course, also a layer filter or mass filter in the manner of a filter press or a tank filter may be employed. The settling filter 10 has its front side 11 provided with an inlet and outlet connection 12 and 13 respectively. Connected to the inlet connection 12 is a conduit (not illustrated further) for the liquid to be conveyed to the filter 10, whereas to the outlet connection 13 there is connected by a screw connection 14 a conduit 15 which conveys the liquid discharged from the filter 10. The conduit 15 leads to a pressure tank 16 having an inlet conduit 17 to which said conduit 15 is likewise connected by a further disengageable screw connection 18. Interposed in conduit 15 is an expediently pneumatically operable three-way valve 19. This valve 19 is provided with a reversing device 20 the control conduit I of which (FIG. 2) leads to a control device 21 which expediently is mounted on supports 22. The conduit 15 is detachably mounted on the adjacent pair of supports by means of pipe clamps 23. A throttling device 36 is inserted in conduit 15 between valve 19 and filter outlet connection 13, expediently in the direct vicinity of the valve 19. Throttling device 36 is bridged by a bypass line 35 which branches off from conduit 15 and again leads into the same. Into said bypass line 35 is interposed a density value receiver 24.

A conduit 26 which is connected to an outlet connection 25 of valve 19 branches off from conduit 15. Conduit 26 leads to a further pressure tank 27 and is connected with the inlet conduit 28 of tank 27 through the intervention of a screw connection 29 and by means of a further pipe clamp 30 is fixed to a support 22. Interposed in conduit 26 is a further three-way valve 31 with a reversing device 32 and with a control conduit II which leads from the device 32 to the control device 21. Connected to the three-way valve 31 is a pipe section 34 extending to an out-flow passage 33.

The design of the conduits 15 and 26 with the respective inserted remote controllable valves 19 and 31 and the measuring receiver 24 with bypass conduit 35 and throttling device 36 is designed as an independent structural unit. After loosening the screw connections 14, 18 and 29 and after loosening the pipe clamps 23 and 30, the said structural unit can at any time be disengaged and removed or if desired can at any time be exchanged by a similar new unit.

Figure 2:
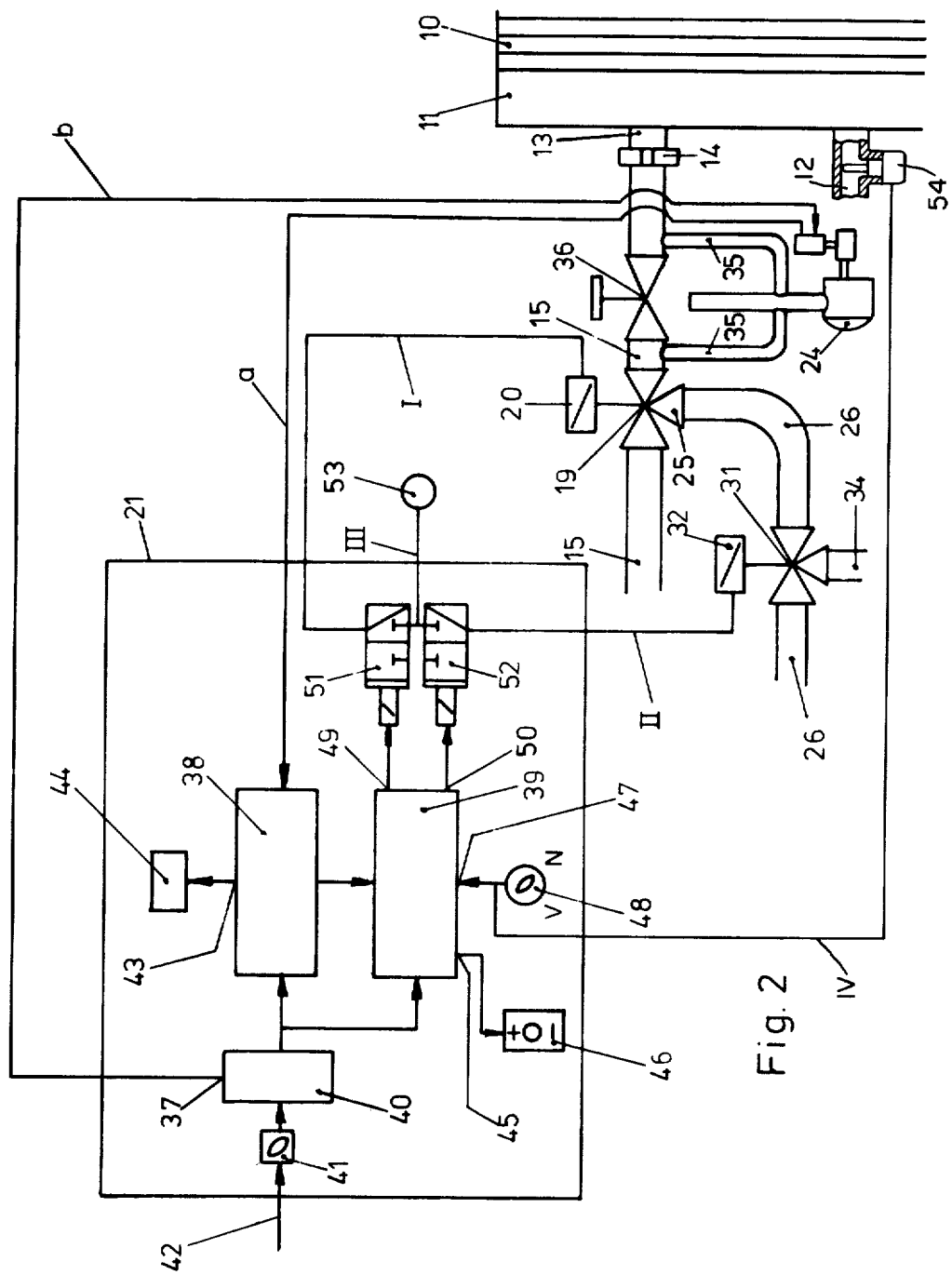
FIG. 2 shows a detail of the device of FIG. 1.

As will furthermore be seen from FIG. 2, the measured value receiver 24 communicates with a measured value adaptor 38 to which is connected a measured value emitter 39. Adaptor 38 and emitter 39 which are arranged within the control device 21 together with the receiver 24 form a measuring chain. This measured chain is supplied from a network 40 arranged within the control device 21, and this is effected in the same manner as the measured value receiver 24 which is connected to the network connection 37 through line b. The power supply unit 40 is adapted by means of a switch 41 provided on the device 21 to be connected to and disconnected from the operational supply network 42, switch 41 simultaneously forming the inlet and outlet switch for the measuring chain 24, 38, 39.

The adaptor 38 has an exit 43 for a device 44 which continuously indicates the density value of the liquid ascertained by the receiver 24 in the bypass line 35. This density value is indicated in the form of successive numerals. In contrast thereto, the emitter 39 has an exit 45 for a device 46 which with increasing density values indicates the positive deviation from the stored reference value and with decreasing values indicates the negative deviation from the stored reference value. The emitter 39 furthermore comprises an inlet 47 for a control device 48 for making the reversing points for the initial flow or post flow, and furthermore has exits 49, 50 for one electro-pneumatic converter 51, 52 each for actuating the reversing devices 20, 32 respectively associated with the three-way valves 19, 31. The converters 51 and 52 are by means of a conduit III connected to a compressed air network 53 of the plant. Also of the conduits I and II leading to the control device 21, the conduit I is connected to the converter 51 while the conduit II is connected to the converter 52. Instead of the manually operable switch arrangement 48, the emitter 39 is adapted through the inlet 47 to be controlled by a remote control device. Such remote control device may consist for instance of a program control mechanism, a conductivity measuring devices or a density measuring device while the measured value emitter 54 thereof is arranged in the feeding line 12 of the filter 10 and signals the feeding of beer or water through conduit IV to the emitter 39 as shown in FIG. 2.

There will now be described the operation for a beer filtration with filter advance and post flow, tank 16 being assumed to be a beer tank and 27 being supposed to be a mixture tank.

After the throttle 36 has been so set that in the bypass conduit 35 there prevails a flow suitable for receiving the measured value, and after the measuring device with the switch 41 has been turned on and by means of the switch 48 has been set for advance signal flow "V" at the exits 49, 50 of the measured value emitter 39, a signal is emitted which brings about a reversal of the converter 51, 52. As a result thereof, the two reversing devices 20, 32 of the three-way valves 19, 31 are respectively set for a rectangular passage. In this valve position, through conduit 15, valve 19, conduit 26, valve 31, and pipe connection 34, there is established a conduit connection which leads to the passage 33, and the flow to the two tanks 16, 27 is blocked. If thereupon filter material flows through inlet connection 12 to the filter 10, this filter materials will from the filter displace the water which might have been left therein from the rinsing operation and which now flows through the existing conduit connection into the passage 33. As soon as the adaptor 38 has stored as reference value the density value of the flowing-off liquid which density value is measured first by the measured value receiver 24 behind the filter outlet 13 in the bypass conduit 35 there is, within a defined time, with regard to the stored value, a further density value ascertained by the receiver 24 in the adaptor 38 compared with the reference value. If during this comparison which is carried out after the respective density measurement while the device 44 simultaneously indicates the respective stored reference value and the ascertained density values in the form of successive numbers and while additionally the device 46 indicates the positive deviation, the ascertained density value differs from the reference value, the first reversing point is obtained, and the adaptor extinguishes the signal at the exit 50 of the emitter 39. As a result thereof, the converter 52 becomes currentless and occupies a switching position in which the reversing device 32 is filtrated through control conduit II, and in which the three-way valve 31 interrupts the connection to the passage 33 and by means of a straight liquid passage through conduit 26 and inlet conduit 28 establishes the connection and the liquid transport to the tank 27. The connection to tank 27 remains until the adaptor 38 which has still stored the reference value decisive when fixing the first reversing point and compares this value successively with the density values which in a defined time sequence is continuously ascertained by the receiver 24. When the values differ from each other, the adaptor 38 stores the respective successively ascertained density value in its turn as reference value, and this value is then by said adaptor compared with the further ascertained density values in a successive manner. If again a difference in the values is ascertained, the adaptor again stores the density value as reference value until equivalence between a previously density value ascertained as reference value and a subsequently measured density value has been ascertained. Also in this instance, in the devices 44 and 46, the reference values and density values as well as the positive deviation are indicated in the form of successive numbers. In case of equivalency, which becomes apparent in the device 44 by a stop of the sequence of numbers, an indication of the last density value stored as reference value and the subsequent reversing point, the adaptor 38 initiates the signal at the exit of the emitter. As a result thereof, the converter 51 occupies a switching position in which through the intervention of the control conduit I, the reversing device 20 is vented and the three-way valve cuts off the connection to the conduits 26, 28 and tank 27 and in a straight passage through the entire conduit 15 establishes the flow to the tank 16 which receives the filtered beer.

For the post flow phase with the displacement liquid for instance water, provided therefor, the control device 48 is set for post flow. If thereupon the adaptor 38 registers a density value measured by the receiver 24 which density value differs from the reference value last stored in the adaptor 38 and originating in the filtration operation, the first reversing point is obtained, and the emitter 39 receives a signal from the adaptor 38. This signal appears at the exit 49 and causes the converter 51 to reverse the three-way valve 19. This valve 19 then interrupts the liquid path leading to the tank 16 and frees said path for the filter material displacing liquid mixture for instance beer-water-mixture flowing off from filter 12 through conduits 15, 26, 28 toward the tank 27. This position of valve 19 is retained until the adaptor 38 which has still stored the reference value decisive when fixing the first reversing point, and compares this value with the density values ascertained further in a defined time sequence and successively by the receiver 24. When the values differ from each other, the adaptor 38 stores the respective subsequently ascertained density value as reference value and compares successively this last mentioned value with the further ascertained density values, and if again a difference in values is ascertained stores the respective density value again as reference value until equivalency has been ascertained between a density value stored previously as reference value and the subsequently measured value. Also in this instance, the indication for the reverence values and density values is effected in the device 44 in the form of successive numbers which indication already stated at the start of the advance flow phase, and the negative device is indicated at the device 46. When equivalency is established which becomes evident by the stopping of the sequence of numbers and by indicating the last density value stored as reference value, a signal is established at the exist 50 of the emitter 39. This signal brings about the reversal of converter 52 which in its turn actuates the reversing device 32 for adjusting the three-way valve 31 which latter turns off the liquid path leading to the tank 27 and for the displacement liquid frees through connection 48 the path 34 to the passage 33.

If during the filtration a change in the beer type occurs and these types have different density values and if for each type there is provided a separate tank, it will be appreciated that with each switch position advance "V" the ascertained density values of the beer leaving the filter is compared with the stored reference value of the previously filtered beer and if the values differ from each other, a first reversing point is fixed. The subsequently reversing point will be obtained as soon as the last stored reference value when being compared with the successive density value is equivalent to the latter. If again the types of beers vary, a first and a further reversing point are fixed in the above described manner. The sequence of numbers indicated in the device 44 may have an increasing and decreasing tendency corresponding to the respective density values. For controlling the transporting direction of the different types of beers, frequently the first reversing point can be omitted and by means of the subsequent reversing point the beer can be passed directly into the pertaining tank. The preceding mixture of beer will thus pass into the tank of the previously filtered type of beer.

It is, of course, to be understood that the present invention is, by no means, limited to the specific showing in the drawings, but also comprises any modifications within the scope of the appended claims.

What is claimed is:

1. The method of operating a filtering system which includes a filter having a fluid inlet and a fluid outlet, a first receiving tank, a second receiving tank, a drain connection and valved conduits connecting the filter outlet with said tanks and said drain connection, said method comprising; continuously measuring the density of the fluid being discharged from the filter outlet, storing an initial measured value as a first reference value, adjusting the valves in said conduits to direct the flow from the filter when the measured value differs a predetermined amount from the stored value, thereafter storing successive measured values to form a changing second reference value and comparing the thus obtained second reference value with measured values in a time sequence, and again adjusting the valves to divert the flow from the filter when a condition of substantial equivalency exists between the stored value and the measured value.

2. The method according to claim 1 in which said successively measured values are stored when the measured value differs a predetermined amount from the next previously stored value.

3. The method according to claim 2 in which the said predetermined amount between a said second reference value and the measured value with which it is compared represents a freely selectable tolerance.

4. The method according to claim 1 in which the reference value and the measured value are digitally displayed.

5. The method according to claim 1 which includes indicating the direction of deviation of the measured values from the reference value.

6. The method according to claim 1 in which the said time sequence is selected in conformity with the filter volume and the flow rate therethrough.

7. The method according to claim 1 in which in one mode of operation the fluid from the filter outlet is diverted from said first tank to said second tank upon the first adjustment of said valves and from the second tank to the drain connection upon the second adjustment of said valves, while in a second mode of operation the aforesaid steps are carried out in reverse order.

8. The method according to claim 7 in which the fluid being filtered is beer and water is employed for periodically flushing the filter, the first adjustment of the valves which diverts the fluid from the filter outlet from the first tank to the second tank occurring during a flushing operation when the density of the beer from the filter outlet is modified a predetermined amount by water, the fluid from the filter outlet being diverted from the second tank to the drain connection when consecutive measurements of the density thereof are substantially equal while at the end of a flushing cycle the fluid from the filter outlet is diverted from the drain connection to the second tank when the density thereof is modified a predetermined amount by beer and thereafter the fluid is diverted from the second tank to the first tank when consecutive measurements of the density thereof are substantially equal.

9. A filter system which includes a filter having a fluid inlet and a fluid outlet, a first tank having an inlet, a second tank also having an inlet and a drain connection; a first conduit detachably connected to the filter outlet and also detachably connected to the inlet of the first tank, a first three way valve in said first conduit, a density measuring device on the upstream side of said first three way valve, a second conduit connected to said first three way valve and detachably connected to the inlet of said second tank, a second three way valve in said second conduit and a discharge conduit connected to said second three way valve and leading to said drain connection, said density measuring device being disposed directly adjacent said first three way valve on the upstream side thereof, said control means including a measured value emitter under the control of said measuring device and a selector connected to said emitter for adjustment thereof into selected operating modes.

10. A filter system which includes a filter having a fluid inlet and a fluid outlet, a first tank having an inlet, a second tank also having an inlet and a drain connection; a first conduit detachably connected to the filter outlet and also detachably connected to the inlet of the first tank, a first three way valve in said first conduit, a density measuring device on the upstream side of said first three way valve, a second conduit connected to said first three way valve and detachably connected to the inlet of said second tank, a second three way valve in said second conduit and a discharge conduit connected to said second three way valve and leading to said drain connection and a restrictor valve bypassing said measuring device.

11. A filter system according to claim 10 which includes control means for actuation of said three way valves.

12. A filter system according to claim 11 in which said control means is adapted for control by a measuring device in the supply conduit connected to the filter inlet.

13. A filter system according to claim 10 in which each three way valve has a first position in which fluid flow in the respective conduit is maintained and a second position in which the fluid flow from the upstream portion of the respective conduit is diverted to the other conduit connected to the respective three way valve.

14. A filter system according to claim 10 in which said first and second and discharge conduits and said first and second three way valves and said density measuring device form an integral unit.

* * * * *